US008672562B2

(12) United States Patent  
Ishii et al.

(10) Patent No.: US 8,672,562 B2  
(45) Date of Patent: Mar. 18, 2014

(54) OPTICAL TRANSCEIVER HAVING EFFECTIVE HEAT CONDUCTING PATH FROM TOSA TO METAL HOUSING

(75) Inventors: Kuniyuki Ishii, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 293 days.

(21) Appl. No.: 13/211,740

(22) Filed: Aug. 17, 2011

(65) Prior Publication Data

US 2012/0045182 A1    Feb. 23, 2012

(30) Foreign Application Priority Data

Aug. 20, 2010    (JP) .................................. 2010-184565

(51) Int. Cl.  
*G02B 6/36*    (2006.01)

(52) U.S. Cl.  
USPC .............................................. 385/92; 385/88

(58) Field of Classification Search  
USPC .......................................................... 385/92  
See application file for complete search history.

(56) References Cited

U.S. PATENT DOCUMENTS

| 7,121,742 | B2 |   | 10/2006 | Oki |
|---|---|---|---|---|
| 7,121,743 | B2 | * | 10/2006 | Mizue ............... 385/92 |
| 7,229,221 | B2 | * | 6/2007 | Ahrens ............ 385/92 |
| 7,309,170 | B2 | * | 12/2007 | Ice et al. ......... 385/88 |
| 7,365,923 | B2 | * | 4/2008 | Hargis et al. ..... 359/820 |
| 7,367,720 | B2 | * | 5/2008 | Mizue et al. ..... 385/92 |
| 7,938,567 | B2 | * | 5/2011 | Faber et al. ...... 362/580 |
| 8,035,973 | B2 | * | 10/2011 | McColloch ...... 361/709 |
| 8,469,609 | B2 | * | 6/2013 | Ishii et al. ........ 385/92 |
| 8,475,057 | B2 | * | 7/2013 | Kihara et al. .... 385/93 |
| 2004/0028315 | A1 | * | 2/2004 | Weigel ............. 385/14 |
| 2004/0105633 | A1 |   | 6/2004 | Ishikawa et al. |
| 2005/0162761 | A1 | * | 7/2005 | Hargis et al. .... 359/820 |
| 2006/0204183 | A1 | * | 9/2006 | Ishikawa ......... 385/88 |
| 2006/0245698 | A1 | * | 11/2006 | Ice et al. ......... 385/88 |
| 2007/0009213 | A1 | * | 1/2007 | Meadowcroft et al. ..... 385/92 |
| 2012/0045181 | A1 | * | 2/2012 | Ishii et al. ....... 385/92 |
| 2012/0045182 | A1 | * | 2/2012 | Ishii et al. ....... 385/92 |

* cited by examiner

*Primary Examiner* — Rhonda Peace  
(74) *Attorney, Agent, or Firm* — Venable LLP; Michael A. Sartori; F. Brock Riggs

(57) ABSTRACT

An optical transceiver having a effective heat conducting path from the TOSA to the metal housing is disclosed. The TOSA has a bottom member, on which a heat generating device such as TEC is mounted, extending to a direction perpendicular to the longitudinal axis of the metal housing. The optical transceiver further includes a block movably in contact with the bottom member of the TOSA and the inner surface of the metal housing to establish the effective heat conducting path from the TOSA to the metal housing.

8 Claims, 10 Drawing Sheets

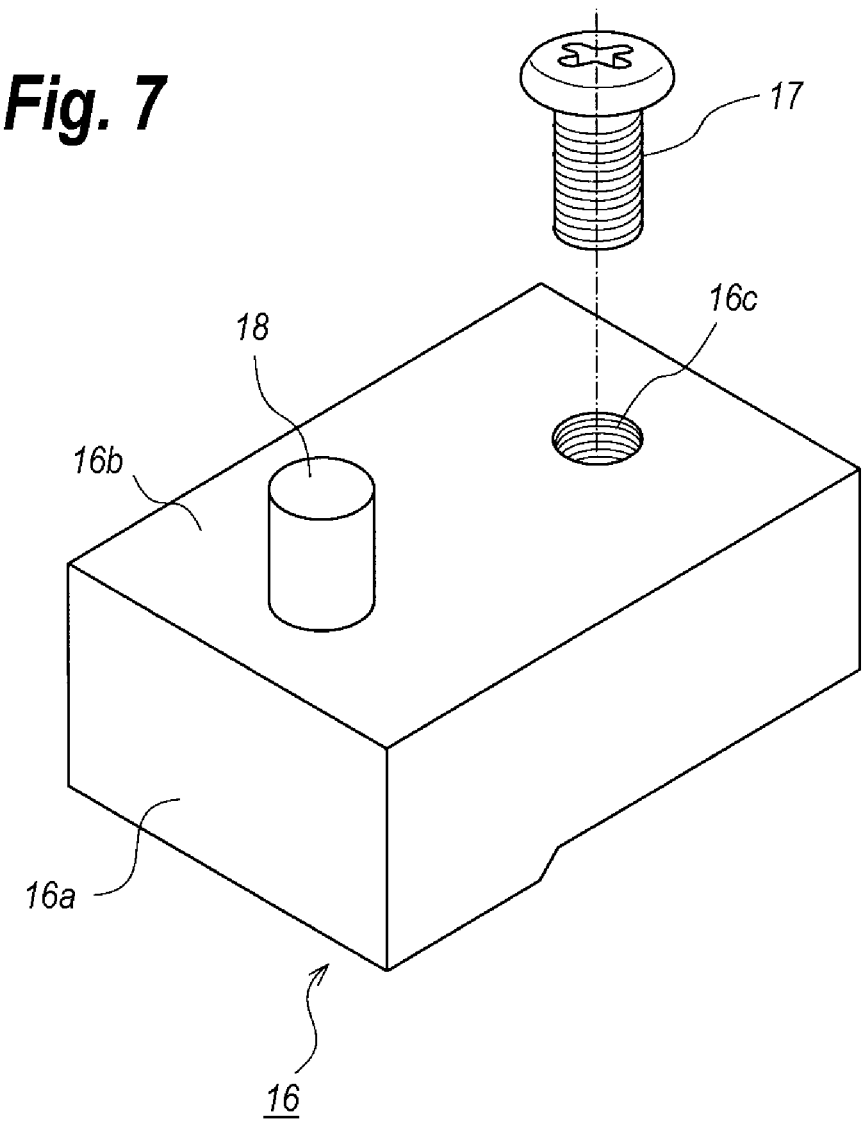

-- PRIOR ART --

OPTICAL TRANSCEIVER HAVING EFFECTIVE HEAT CONDUCTING PATH FROM TOSA TO METAL HOUSING

BACKGROUND OF THE INVENTION

1. Field of the Invention

The present invention relates to an optical transceiver, in particular, the invention relates to a mechanism to conduct heat from a transmitter optical subassembly (hereafter denoted as TOSA) to a metal housing.

2. Related Background Arts

An optical transceiver ordinarily includes a TOSA, a receiver optical subassembly (hereafter denoted as ROSA), an electrical circuit communicating with the TOSA, the ROSA and the host system, and a housing for enclosing the TOSA, the ROSA, and a circuit board mounting the electronic circuit. The TOSA installs a semiconductor laser diode (hereafter denoted as LD) therein. The LD is often necessary to be operated under a constant temperature; so, the TOSA installs a thermo-electric cooler (hereafter denoted as TEC). The TEC generates large heat to cool the temperature of the LD. Accordingly, the TOSA with the TEC is required to dissipate heat generated by the TEC.

FIG. 10 shows a conventional arrangement of the TOSA 101 in the housing, 102 and 103. The TOSA has a rectangular package or a co-axial CAN package, where the heat generated in the package may be radiated from the side surfaces of the package. Moreover, the side surfaces of the TOSA 101 extend substantially in parallel to the longitudinal axis of the housing. Accordingly, putting a material, 106a or 106b, with good thermal conductivity such as a thermal sheet, a thermal gel and the like between the side surface of the package 101a and the housing, 102 or 103, an effective heat conducting path may be established from the TOSA 101 to the housing. However, the conventional arrangement described above is limited in a case where the heat radiating surface of the TOSA 101 faces and is substantially in parallel with the inner surface of the housing. Recent TOSA does not always provide such a heat radiating surface.

In particular, when the TOSA provides a ceramic package whose side surfaces are made of multi-layered ceramics and the heat radiating surface thereof is limited to the bottom portion of the package and the bottom extends in directions perpendicular to the longitudinal axis of the housing; another arrangement to establish a path to conduct heat from the package of the TOSA to the housing is necessary.

SUMMARY OF THE INVENTION

An aspect of the present invention relates to an optical transceiver that includes a metal housing, an optical subassembly, and a block. The metal housing has an optical receptacle for receiving an external optical connector and an electrical plug for communicating with the host system. The housing has a longitudinal axis that connects the optical receptacle and the electrical plug. The optical subassembly, which may be installed within the metal housing, may have a package including a bottom member that mounts an LD thereon. The bottom member of the package extends along a direction intersecting, or in perpendicular, to the longitudinal axis of the metal housing. According to an embodiment of the invention, the block is thermally in contact with the bottom member of the OSA and also an inner surface of the metal housing to establish a path to conduct heat from the OSA to the housing. A feature of the present invention is that the block is movably assembled with the metal housing.

BRIEF DESCRIPTION OF THE DRAWINGS

The invention will be described in conjunction with the accompanying drawings, in which:

FIG. 7 shows a block to conduct heat according to an embodiment of the invention;

DETAILED DESCRIPTION OF PREFERRED EMBODIMENTS

Figure 1:
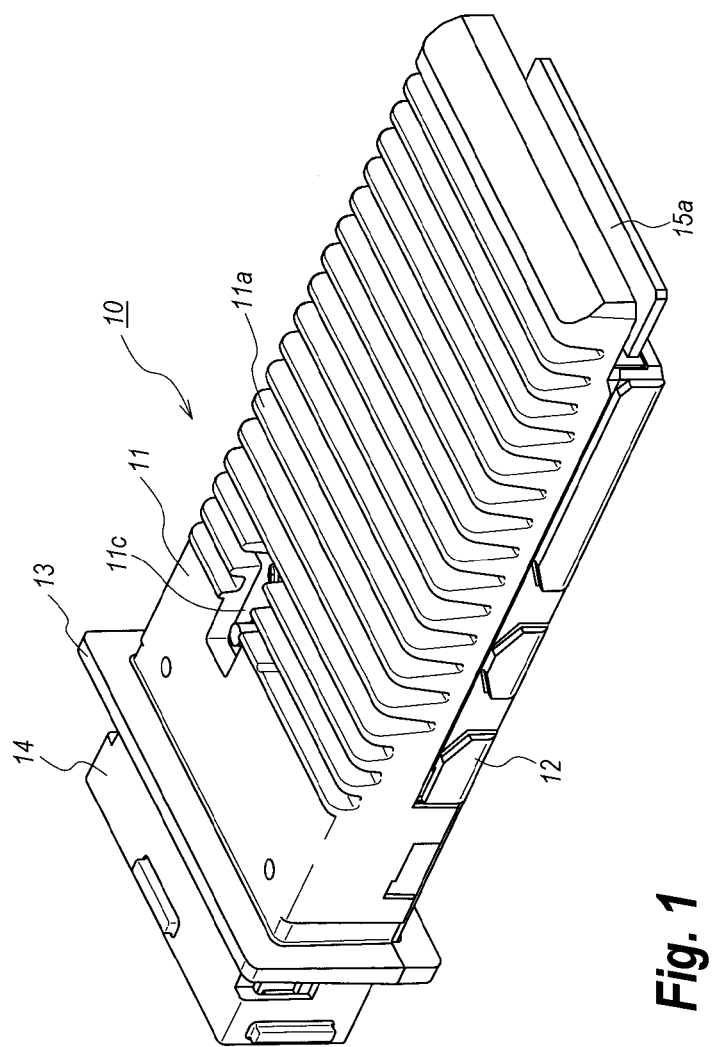
FIG. 1 is a perspective view showing an outer appearance of the optical transceiver according to an embodiment of the present invention.

Next, some preferred embodiments according to the present invention will be described in detail. An optical transceiver 10 according to the present invention may includes a TOSA, a ROSA, an electronic circuit mounted on a circuit board, and a housing comprising an upper cover 11 and the a lower cover 12. The upper cover 11 and the lower cover 12 may be made of metal to conduct and radiate heat generated within the housing efficiently. In particular, the upper cover has a plurality of fins 11a to radiate heat effectively. The upper cover 11 also includes an aperture 11c through which the block to conduct heat is assembled and aligned from the outside of the housing. The upper and lower covers, 11 and 12, have a flange 13 in a front portion thereof to cover a port through which the optical transceiver 10 is installed within the host system. The housing further includes an optical receptacle 14 in the front side of the flange 13, which receives an external optical connector. On the other hand, a rear end of the housing protrudes an electrical plug 15a which is an end of the circuit board in the housing. When the optical transceiver 10 is set in the host system, the electrical plug 15a mates with an electrical connected prepared in the host system, which may establish a communication between the optical transceiver 10 and the host system. In the explanation, the front side of the optical transceiver 10 corresponds to a side where the optical receptacle positions, while, the rear corresponds to the side of the electrical plug 15a.

Figure 2:
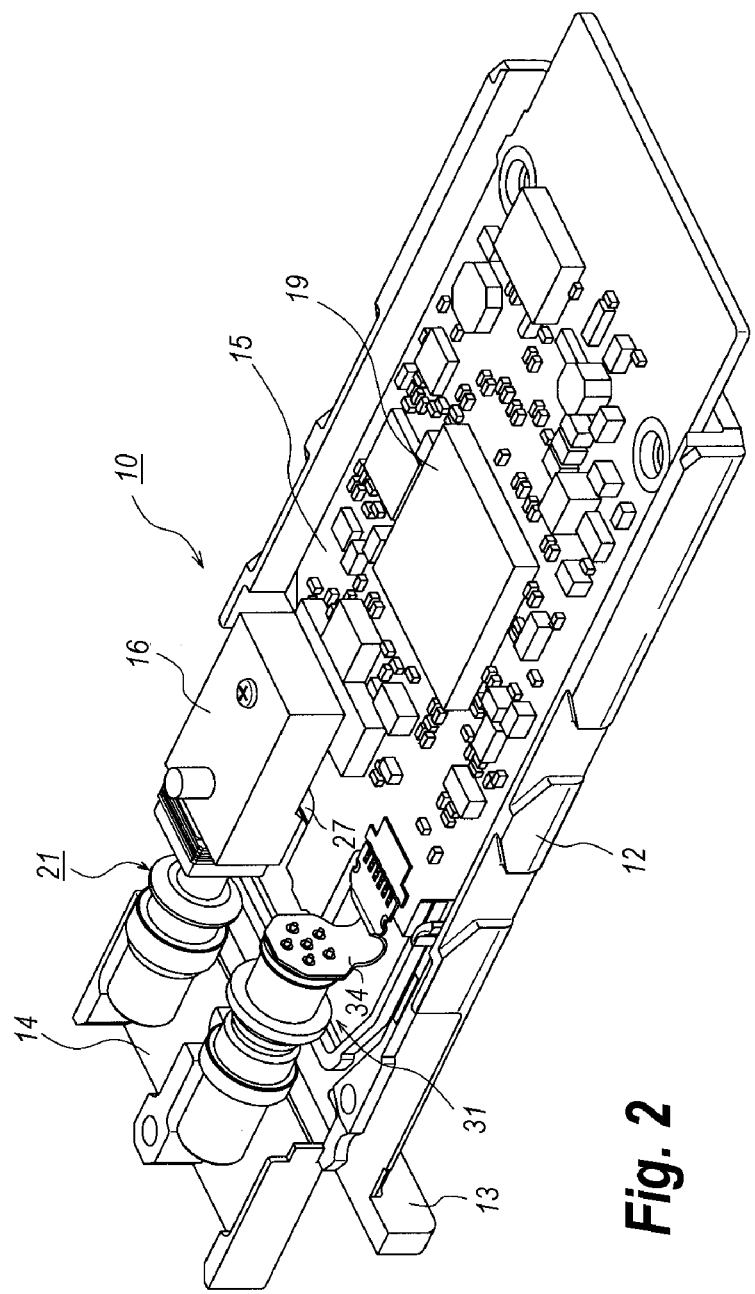
FIG. 2 shows an inside of the optical transceiver shown in FIG. 1, which removes the upper cover thereof.

FIG. 2 shows the inside of the housing by removing the upper cover 11. The lower cover 12 installs the circuit board 15 thereon, and the circuit board 15 mounts an electronic circuit including an IC 19 and some active and passive components. The TOSA 21 and the ROSA 31 are mounted in frontward of the circuit board 15. These OSAs, 21 and 31, may electrically couple with the circuit on the circuit board through respective FPCs, 27 and 34.

The TOSA 21 and the IC 19 are the major components in the optical transceiver 10 to generate heat. The present embodiment shows a mechanism to conduct heat generated in the TOSA 21 to the housing, specifically, the upper cover 11 effectively. That is, the optical transceiver 10 of the present embodiment has a block 16 thermally coupled with the TOSA 21 and the upper cover 11. The block 16 may conduct heat effectively from the TOSA 21 to the upper cover 11 by coming in tightly contact with the TOSA 21 and the upper cover 11.

Figure 3:
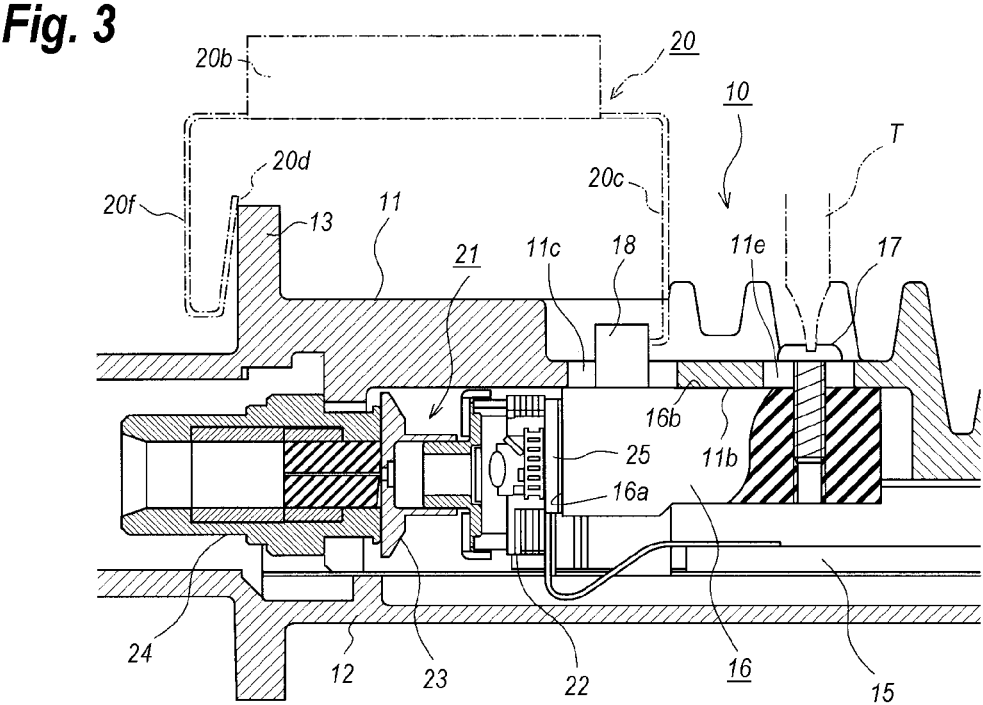
FIG. 3 is a cross section showing a primary portion of the optical transceiver shown in FIG. 1, where the cross section is taken along the longitudinal direction of the optical transceiver.

FIG. 3 magnifies a primary portion of the mechanism to conduct heat from the TOSA 21 to the upper cover 11. The TOSA 21, as described below by referring to FIGS. 4 to 6, includes a ceramic package 22, a sleeve portion 24 and a joint sleeve to couple the ceramic package 22 with the sleeve portion 24. The ceramic package 22 of the present embodiment is necessary to be dissipated heat from the rear surface, not side surfaces, thereof intersecting, or perpendicular, to the longitudinal direction of the optical transceiver 10. The side surfaces of the ceramic package 22 are substantially in parallel to the longitudinal direction of the optical transceiver 10, which may facilitate to conduct heat from the TOSA 21 to the housing as those of the conventional arrangement shown in FIG. 9. However, the ceramic package 22 has a heat radiating surface extending in perpendicular to the longitudinal direction of the housing.

The optical transceiver 10 of the present embodiment arranges the block 16 behind the ceramic package 22, specifically, a front surface 16a of the block 16 is in physically and thermally contact with the bottom member 25 of the ceramic package 22. While, a conducting surface 16b, the top surface thereof, which is substantially in perpendicular to the front surface 16a, is in physically and thermally contact with the inner surface 11b of the upper cover 11. The block 16, as described later, may be assembled with the upper housing 11 such that the tool 20 supports the block 16 and abuts the front surface 16a thereof against the bottom member 25 first, and a screw 17 makes the conducting surface 16b in contact with the inner surface 11b of the upper cover 11. Thus, the path to conduct heat from the TOSA 21 to the upper cover 11 may be established.

The block 16 may be made of material with good thermal conductivity, typically a metal of aluminum (Al) or copper (Cu), or a ceramics of aluminum nitride (AlN). The embodiment shown in FIG. 11 may further include a thermal sheet, a thermal gel, or thermal grease between the block 16 and the bottom member 25 of the ceramic package 22. These materials may fill gaps or compensate unevenness between the bottom member 25 and the front surface 16a. In particular, when the front surface 16a extends not in parallel to the bottom member 25, the flexible member such as thermal sheet or gel becomes effective to fill the gaps. Specifically, the angle between the front surface 16a and the conducting surface 16b of the block depends on the stability of the process to form the block; while, the vertical angle of the bottom member 25 of the ceramic package 22 depends on the assembly of the ceramic package 22 itself, the assembly of the ceramic package to the sleeve portion 24, and the assembly of the TOSA to the housing. Accordingly, the front surface 16a is not always in parallel to the bottom member 25.

The upper and lower covers, 11 and 12, position the TOSA 21 by supporting the sleeve portion 24 thereof. As described above, the assembly of the ceramic package 22 that of the TOSA 21 influences the position of the bottom member 25 along the longitudinal direction of the optical transceiver 10. The block 16 and the upper cover 11 according to the embodiment have a mechanism to align the block 16 along the longitudinal direction, which may compensate the positional deviation along the longitudinal direction of the bottom member 25. Moreover, the front surface 16a has an area wider than that of the bottom member 25, which may make the whole bottom member 25 in reliably contact with the front surface 16a.

Figure 4:
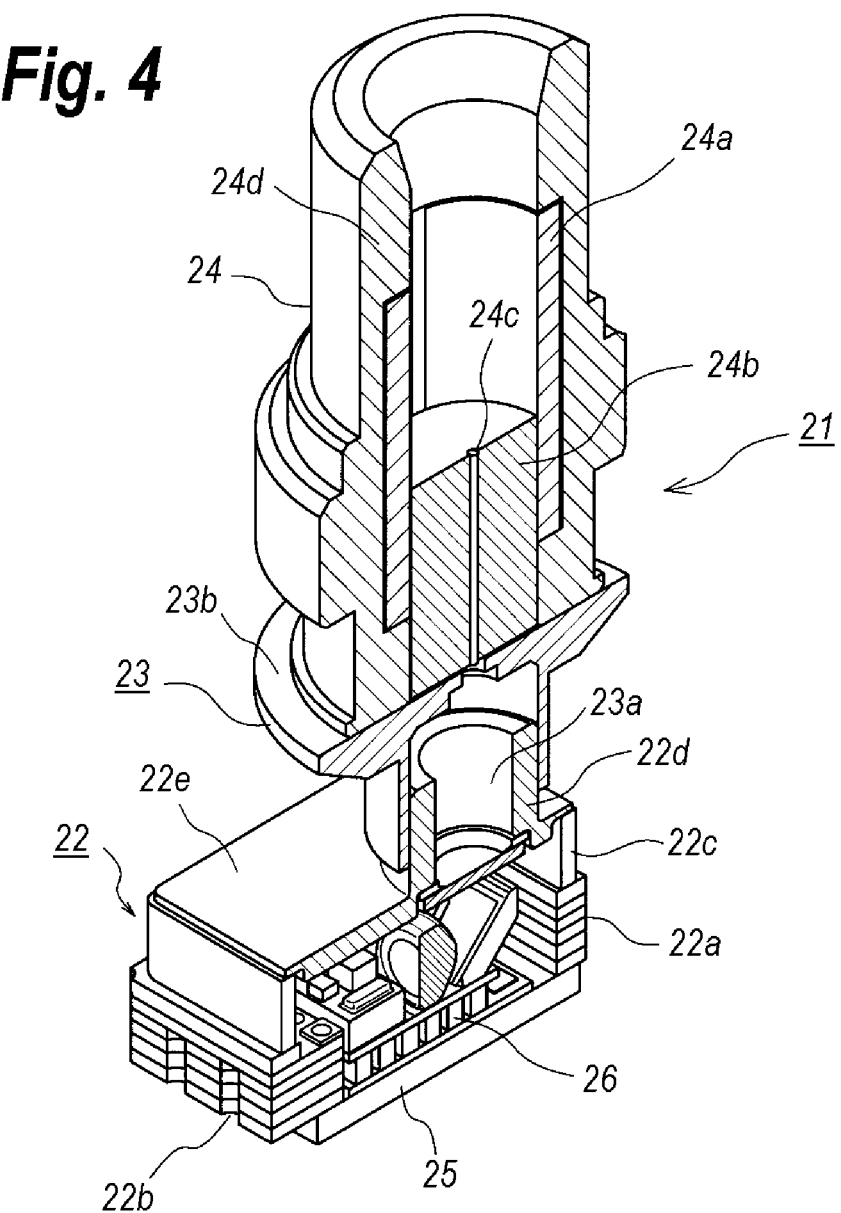
FIG. 4 is a partially cut away view showing a TOSA installed in the optical transceiver shown in FIG. 1.
Figure 5:
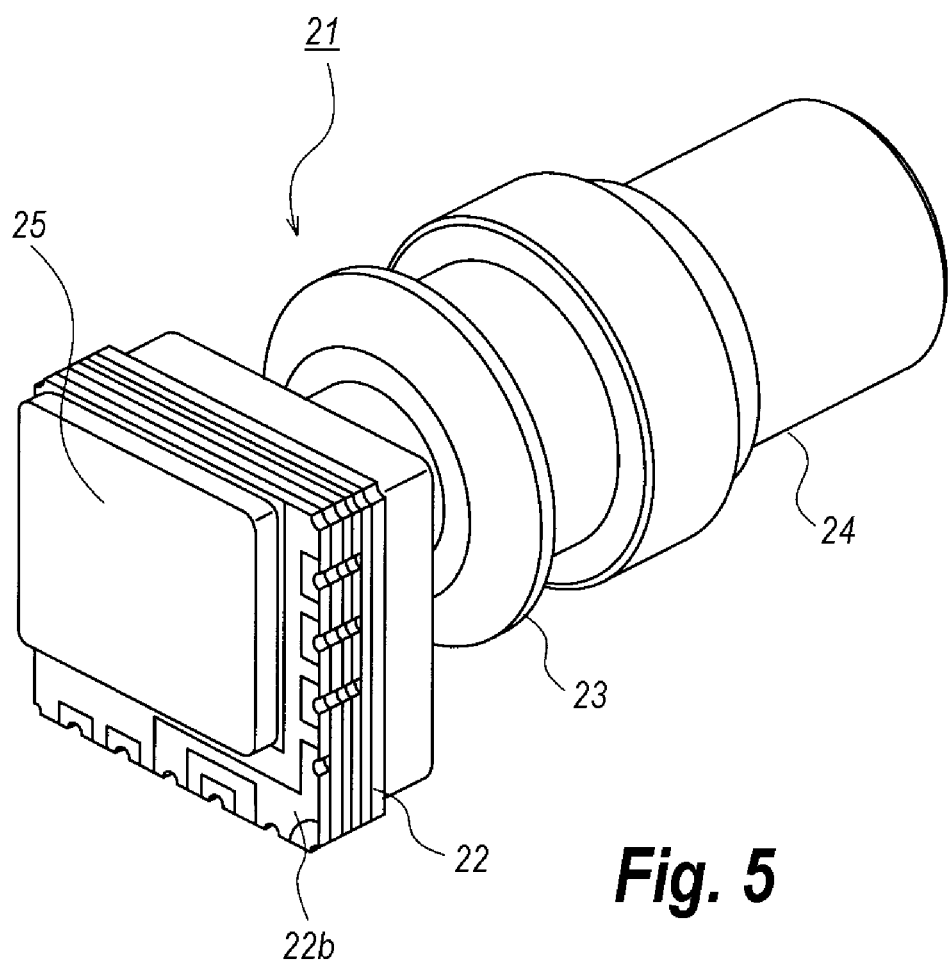
FIG. 5 is a perspective view of the TOSA shown in FIG. 4.

FIGS. 4 to 6 show an example of the TOSA 21 according to the present invention. The TOSA 21, as described, includes the ceramic package 22, the sleeve portion 24, and the joint sleeve 23. The ceramic package 22 has, what is called as the multi-layered structure for the side wall 22a thereof as shown in FIG. 4. The side wall 22a also includes a plurality of electrodes 22b to bring internal interconnections out of the package. These multi-layered side walls 22a are mounted on the bottom member 25, while, the side walls 22a mounts a ceiling 22e through a support wall 22c. The ceiling 22e has a cylinder 22d in a position offset from a center thereof. The bottom member 25 mounts a thermo-electric cooler (hereafter denoted as TEC) 26 thereon, while the TEC 26 mounts optical components thereon including an LD, a photodiode (PD) to monitor an emission of the LD, a condenser lens and so on.

The joint sleeve 23 couples the ceramic package 22 with the sleeve portion 24 mechanically and optically. Specifically, the optical alignment between the sleeve portion 24 and the ceramic package 22, specifically the LD in the ceramic package 22, may be aligned by adjusting the overlapping depth between the cylinder 22d and the bore 23a of the joint sleeve 23, which is the optical alignment along the optical axis. On the other hand, sliding the sleeve portion 24 on the end surface 23b of the joint sleeve 23, the optical alignment may be carried out in a plane perpendicular to the optical axis. Thus, the optical alignment between the sleeve portion 24 and the ceramic package 22 may be realized.

The sleeve portion 24 includes a sleeve 24a, a stub 24b, and a sleeve cover 24d. The sleeve 24a receives a ferrule assembled in an external optical connector, which is not shown in FIG. 4, from an end thereof; while, it receives the stub 24b in the other end. The stub has a coupling fiber 24c in a center thereof. When the sleeve 24a receives the ferrule and an external fiber held by the ferrule abuts in a tip end thereof against the tip of the coupling fiber; the optical coupling between the external fiber and the coupling fiber may be realized. Moreover, the emission coming from the LD in the ceramic package 22 is concentrated on another end of the coupling fiber 24c facing the ceramic package 22, the optical coupling between the LD and the external fiber may be performed.

The bottom member 25, which forms the bottom with respect to the side walls 22a of the ceramic package 22, slightly protrudes from the bottom the side walls 22a. The bottom of the side walls has an L-shaped area for the electrodes 22b that occupies two sides continuous to each other of the side walls 22a; while, the rest two sides are for the bottom member 25. The electrodes 22b may be electrically connected with a portion 27a of the FPC 27 for the TOSA 21, as shown in FIG. 6B.

Figure 6A:
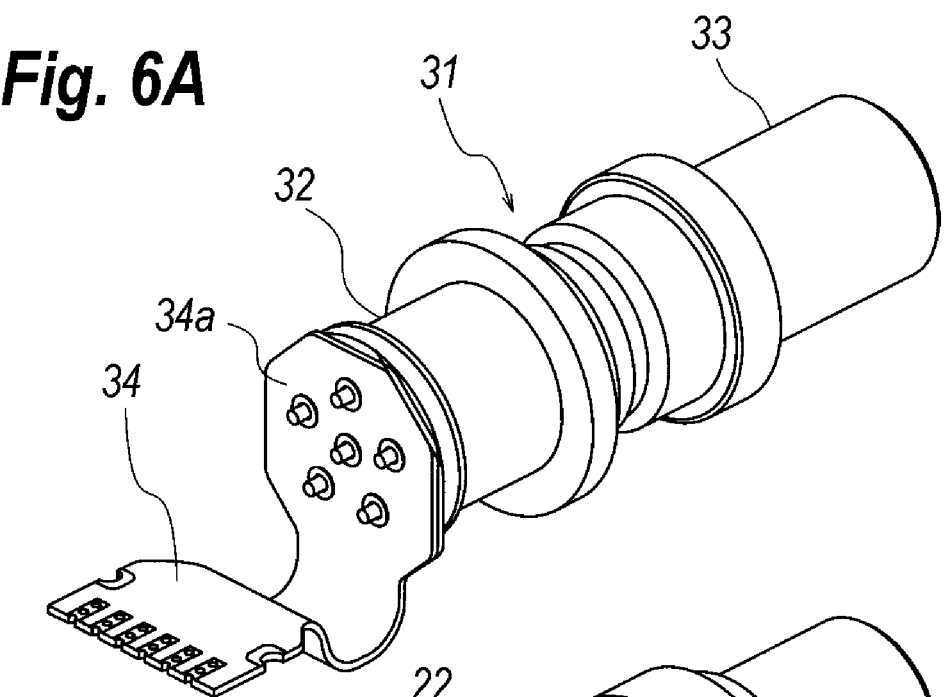
FIGS. 6A and 6B show a ROSA and a TOSA each assembled with respective FPC boards and installed in the optical transceiver shown in FIG. 1.
Figure 6B:
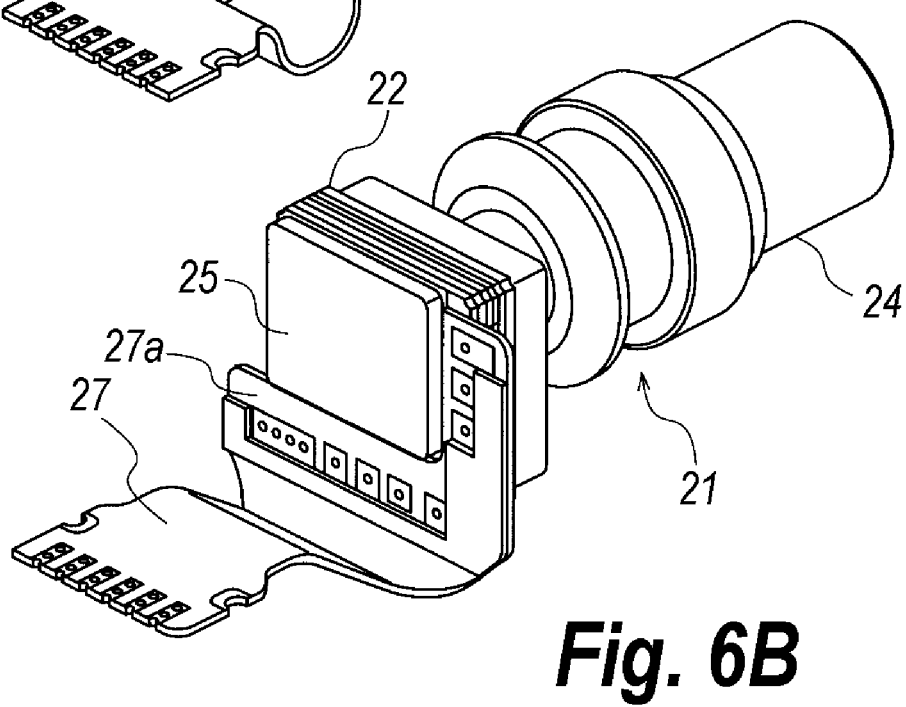

FIGS. 6A and 6B arrange the ROSA 31 and the TOSA 21 each assembled with respective FPCs, 34 and 27. The TOSA 21 has the ceramic package 22 with a square shape as described above; while, the ROSA 31 has, what is called as a co-axial package 32 with a plurality of lead pins extending from the stem thereof. The FPC 34 for the ROSA is soldered in the connecting portion 34a thereof with the lead pins.

FIG. 7 is a perspective view of an example of the block 16. The block 16 may be made of material with good thermal conductivity typically metal such as aluminum (Al) or copper (Cu), or ceramics such as aluminum nitride (AlN). The block 16 shown in FIG. 7 has a rectangular shape, but may have an optional shape as far as at least two surfaces, 16a and 16b, are explicitly defined. The block 16 has a guide 18 and a tapped hole 16c apart from the guide 18 in the conducting surface 16b thereof.

Figure 8:
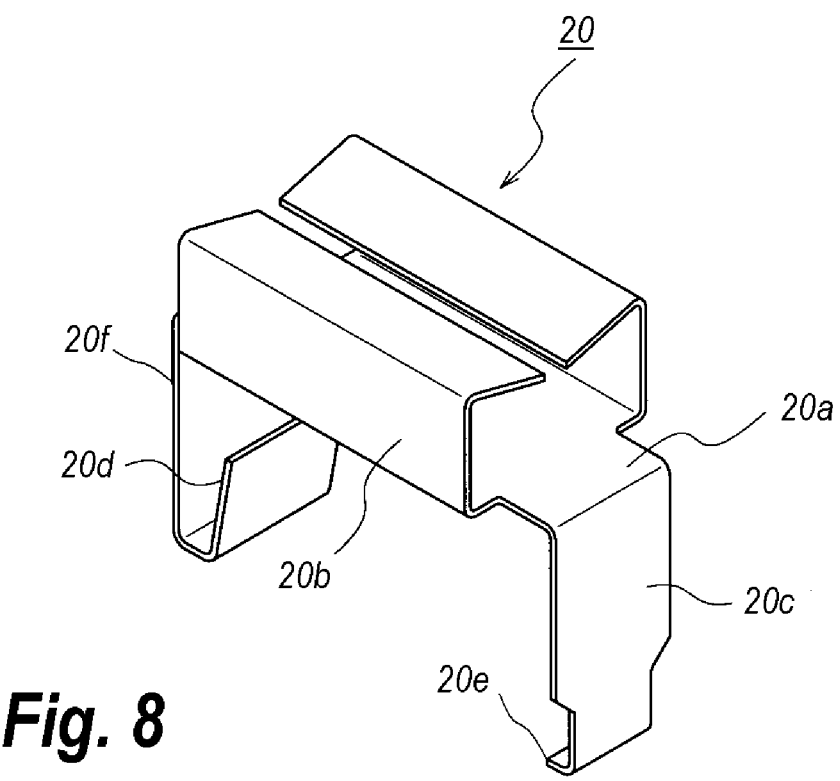
FIG. 8 is a perspective view showing a tool for assembling the block in the housing of the optical transceiver.

FIG. 8 is a perspective view showing the tool 20 to assemble the block 16 with the upper cover 11. The tool 20 may be made of metal sheet only by cutting and bending without soldering, welding and so on, which may reduce the process cost of the tool 20. The tool 20 includes a bridge 20a and two legs, 20c and 20f, extending downward from the bride 20a. The bridge 20a has extensions 20b each extending from the sides of the bridge 20a, bent upward, and further bent inward. The extensions 20b may prevent the bridge 20a from warping upward. One of the legs 20c has a tab 20e in the tip thereof, which is bent inwardly. The tab 20e abuts against the guide 18 of the block 16. The other leg 20f is bent twice in the tip end thereof to form another tab 20d.

Figure 9:
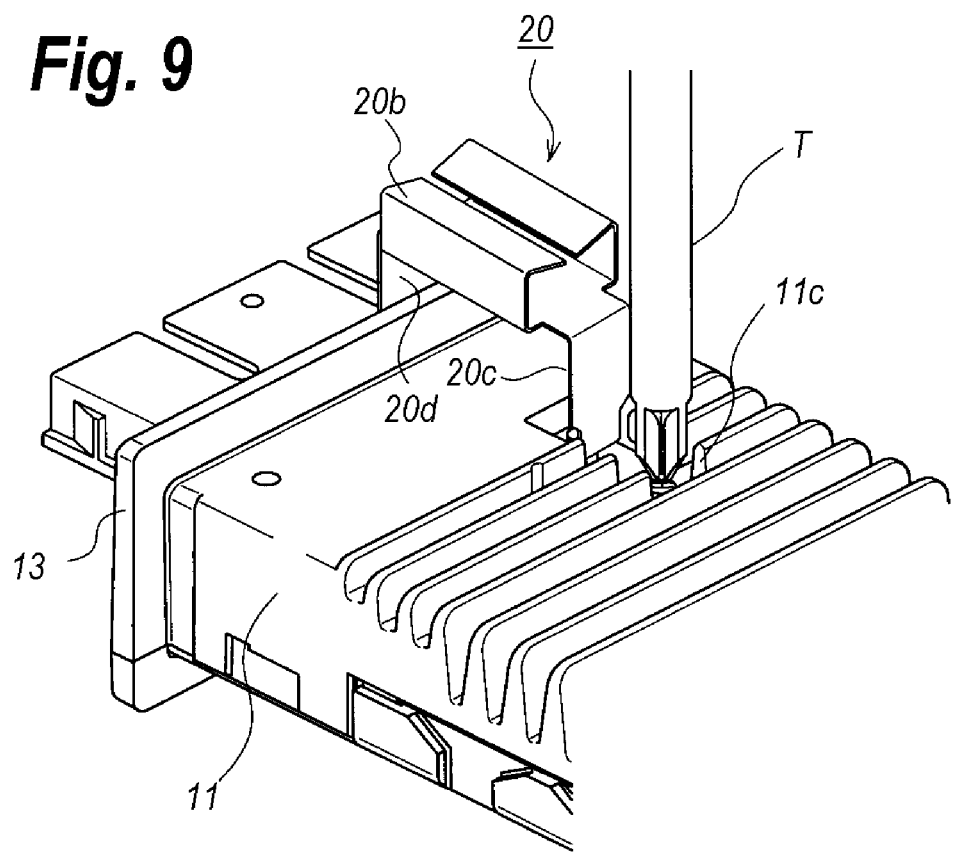
FIG. 9 shows a process to assembly the block with the housing.
Figure 10:
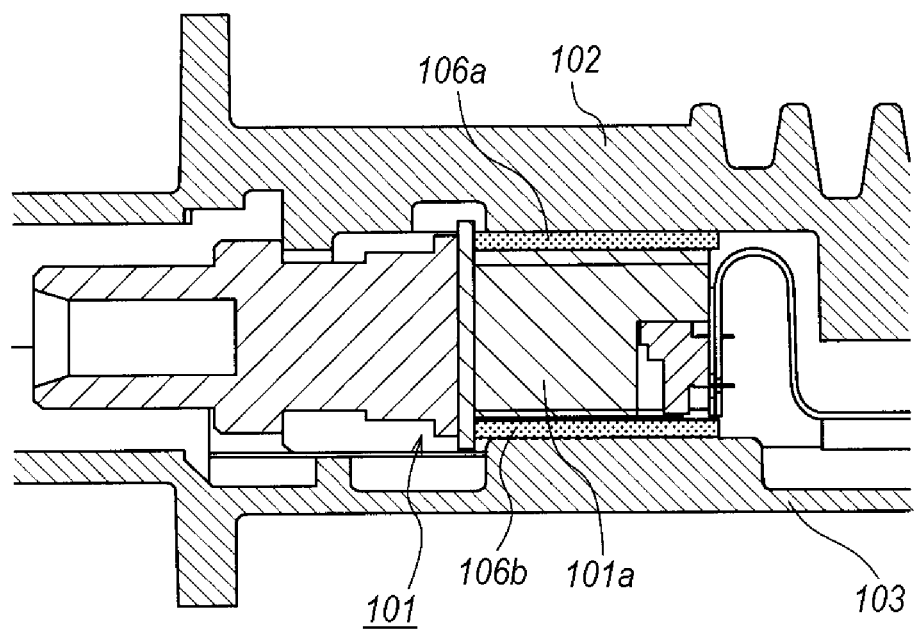
FIG. 10 is a cross section showing a conventional mechanism to conduct heat generated in the TOSA to the housing.

The tool 20 may assemble the block 16 with the upper cover 11 as shown in FIGS. 3 and 9. That is, the block 16 is first assembled with the upper cover 11 by inserting the guide 18 into the aperture 11c from the inside of the cover 11 but loosing the screw 17 with the screw hole 16c through a slit 11e. In this condition, the block 16 may be movable within the aperture 11c and the slit 11e along the longitudinal direction of the optical transceiver. Although FIG. 3 illustrates the slit 11e in a length thereof is longer than a screw top along the longitudinal axis of the housing, the width of the slit 11e along the direction perpendicular to the longitudinal axis is narrower than the screw top. Accordingly, the screw 17 may assemble the block 16 with the upper cover 11.

Under this condition, the tool 20 abuts the tip 20e of the leg 20c against the guide 18, while, the tab 20d in the other leg 20f comes in contact with the front surface of the flange 13. The tab 20d causes an elastic force so as to push the tool 20 frontward; accordingly, the block 16 comes in reliably contact with the bottom member 25 of the ceramic package 22 pushed by the tip 20e of the tool 20. Fastening the screw 17 by the screwdriver T, the block 16 may be rigidly assembled with the upper cover 11 as the front surface 16a thereof in contact with the bottom member 25 of the ceramic package 22. Although the embodiment shown in FIG. 3 has the tool 20 fastening the guide 18 and the flange 13 by the legs, 20c and 20f, the tool 20 in the leg 20f may be set against the front end of the optical transceiver 10.

In the foregoing detailed description, the optical transceiver of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver, comprising:
a metal housing including an optical receptacle for receiving an external optical connector and an electrical plug for communicating with a host system, the metal housing having aperture, a slit, and a longitudinal axis connecting the optical receptacle with the electrical plug;
an optical subassembly installed in the metal housing, the optical subassembly having a package with a bottom member for mounting a semiconductor optical device, the bottom member extending along a direction intersecting the longitudinal axis of the metal housing; and
a block thermally in contact with the bottom member of the optical subassembly and an inner surface of the metal housing, the block having a guide and a screw hole,
wherein the block is movably assembled with the metal housing by passing the guide of the block through the aperture of the metal housing and a screw screwed in the screw hole of the block through the slit of the metal housing.

2. The optical transceiver of claim 1,
wherein the aperture of the metal housing has a width that is the same as a width of the slit along the longitudinal axis of the metal housing.

3. The optical transceiver of claim 2,
wherein the slit has a length along a direction perpendicular to the longitudinal axis less than a size of a screw top of the screw.

4. The optical transceiver of claim 1,
wherein the block has a surface in contact with the bottom member of the package through one of a thermal sheet, a thermal gel, and a thermal grease.

5. The optical transceiver of claim 4,
wherein the block has an other surface in contact with the inner surface of the metal housing,
wherein the surface and the other surface of the block makes a substantially right angle.

6. The optical transceiver of claim 1,
wherein the optical subassembly is a transmitter subassembly that installs a semiconductor laser diode and a thermo-electric cooler,
wherein the semiconductor laser diode is mounted on the thermo-electric cooler, and the thermo-electric cooler is mounted on the bottom member of the package.

7. The optical transceiver of claim 1,
wherein the package of the optical subassembly has a multi-layered ceramic package.

8. The optical transceiver of claim 1,
wherein the block is made of aluminum, copper, or aluminum nitride.

* * * * *